United States Patent
Ivankovic et al.

(10) Patent No.: US 9,912,241 B2
(45) Date of Patent: Mar. 6, 2018

(54) SYSTEM AND METHOD FOR A CASCODE SWITCH

(71) Applicant: Infineon Technologies Austria AG, Villach (AT)

(72) Inventors: Mladen Ivankovic, Oakville, CA (US); Xiaowu Gong, Singapore (SG); Fred Sawyer, Foxboro, MA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 25 days.

(21) Appl. No.: 15/014,974

(22) Filed: Feb. 3, 2016

(65) Prior Publication Data

US 2017/0222561 A1   Aug. 3, 2017

(51) Int. Cl.
*H02M 3/335* (2006.01)

(52) U.S. Cl.
CPC .............................. *H02M 3/33507* (2013.01)

(58) Field of Classification Search
CPC ............. H02M 3/335; H02M 3/33507; H02M 2001/0009; H02M 2001/0058; H02M 1/083; H02M 1/4258; G01R 19/175
USPC .......................................... 363/21.04–21.18
See application file for complete search history.

(56) References Cited

U.S. PATENT DOCUMENTS

| 5,602,724 | A | * | 2/1997 | Balakrishnan | H02M 1/34 363/21.15 |
| 6,775,164 | B2 | * | 8/2004 | Wong | H02M 3/156 363/147 |
| 8,653,881 | B2 | | 2/2014 | Ivankovic | |
| 8,779,841 | B2 | | 7/2014 | Ivankovic | |
| 2007/0070659 | A1 | * | 3/2007 | Sawtell | H02M 3/33523 363/21.01 |
| 2008/0088292 | A1 | * | 4/2008 | Stoichita | H02M 3/156 323/285 |
| 2015/0091536 | A1 | * | 4/2015 | Tanaka | H02M 3/156 323/235 |
| 2015/0214829 | A1 | * | 7/2015 | Xu | H02M 1/083 363/21.03 |
| 2015/0280574 | A1 | * | 10/2015 | Gong | H02M 3/33523 363/21.12 |

* cited by examiner

*Primary Examiner* — Alex Torres-Rivera
(74) *Attorney, Agent, or Firm* — Slater Matsil, LLP

(57) ABSTRACT

In some embodiments, a power system includes an integrated circuit (IC). The IC includes a first switching transistor having a load path coupled between a sensing terminal of the IC and a first terminal of the IC. The first terminal of the IC is configured to be coupled to a first load path terminal of a second switching transistor. The IC also includes a first diode coupled between the first terminal of the IC and a second terminal of the IC. The second terminal is configured to be coupled to an auxiliary winding of the power system. The IC further includes a first driver circuit having an output coupled to a third terminal of the IC. The third terminal is configured to be coupled to a control node of the second switching transistor.

25 Claims, 5 Drawing Sheets

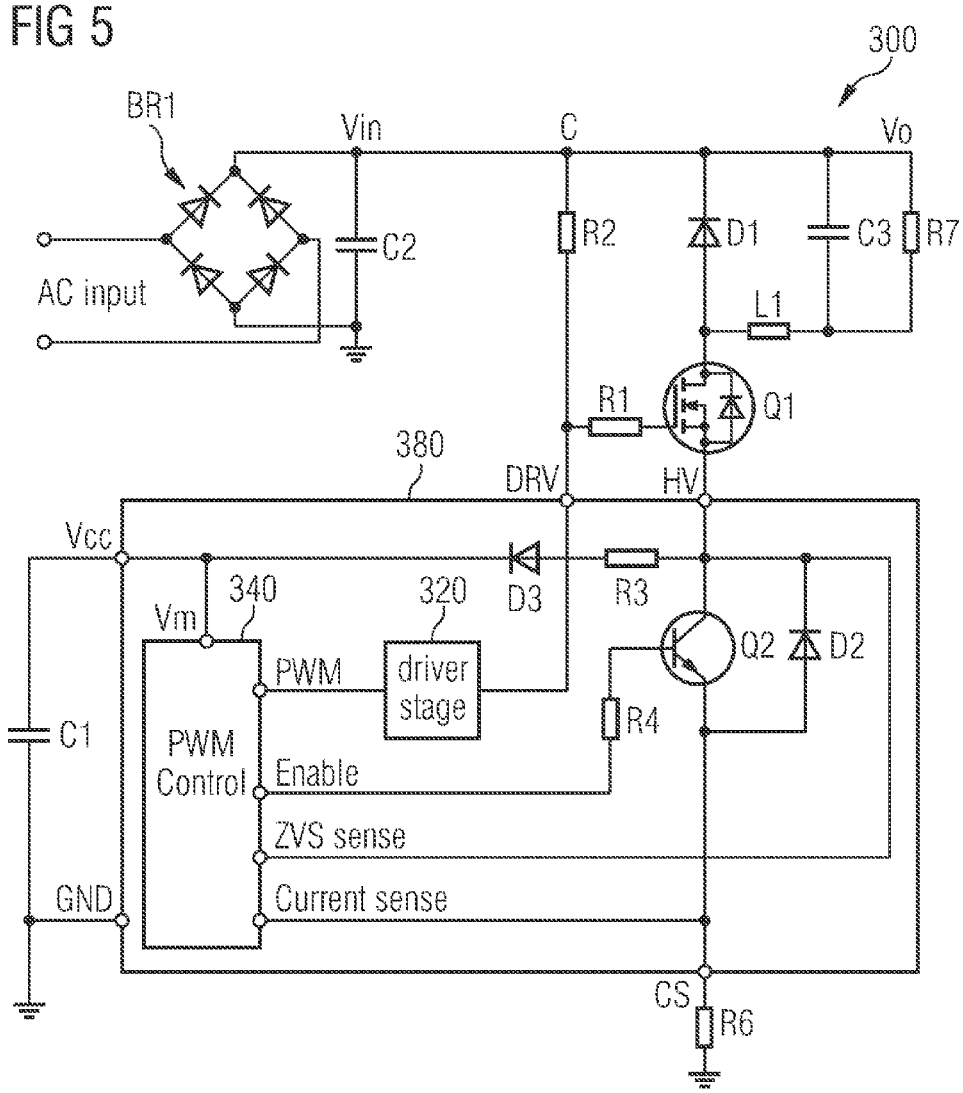

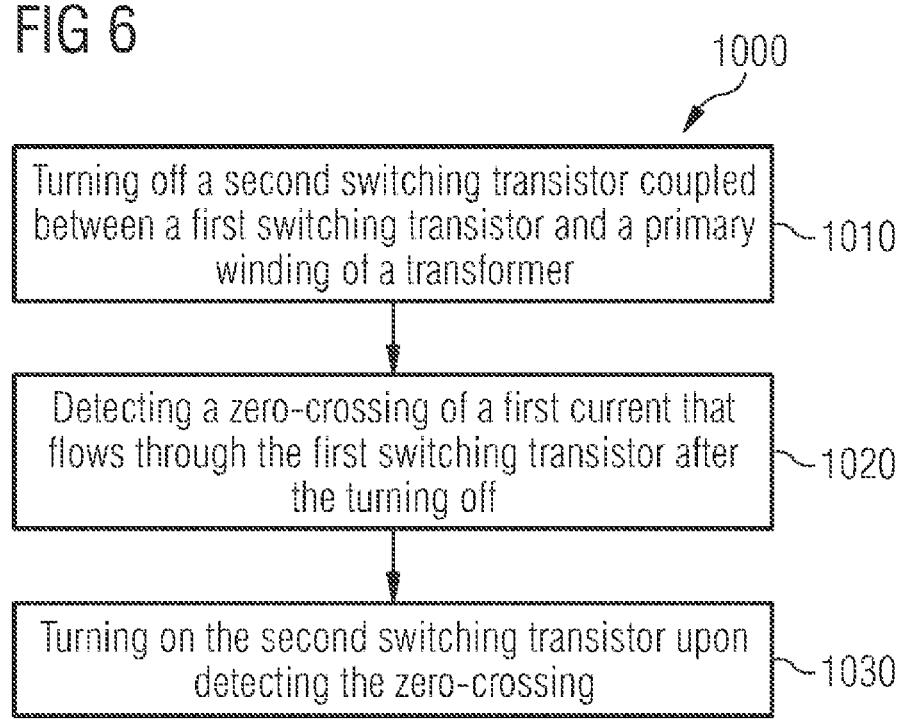

SYSTEM AND METHOD FOR A CASCODE SWITCH

TECHNICAL FIELD

The present disclosure relates generally to switches, in particular to system and method for a cascode switch.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop. In some typologies, the switches used in the SMPS are implemented using cascode switches.

Cascode switches are typically designed with two or more MOSFETs (metal oxide semiconductor field effect transistors) or IGBTs (insulated gate bipolar transistors) connected in series. For example in a two transistor cascode switch, the first transistor is coupled to the load and the second transistor is coupled in series between the first transistor and ground. The transistors are switched on and off in order to switch the load current as demanded or required. The load voltage is distributed across all of the series connected power transistors included in the cascode switch. For example, two 800V rated MOSFETs may be connected in series for switching a 1000V or greater load.

SUMMARY OF THE INVENTION

In accordance with an embodiment, a power system includes an integrated circuit (IC). The IC includes a first switching transistor having a load path coupled between a sensing terminal of the IC and a first terminal of the IC. The first terminal of the IC is configured to be coupled to a first load path terminal of a second switching transistor. The IC also includes a first diode coupled between the first terminal of the IC and a second terminal of the IC. The second terminal is configured to be coupled to an auxiliary winding of the power system. The IC further includes a first driver circuit having an output coupled to a third terminal of the IC. The third terminal is configured to be coupled to a control node of the second switching transistor.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates yet another power converter with a cascode switch in various embodiments; and FIG. 6 illustrates a flow chart of a method for switching a power circuit in some embodiments.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for cascode switches that may be used in power converters (e.g., flyback converters, buck converters) to switch on and off the load current. The invention may also be applied to other systems and applications having circuits that utilize cascode switches.

In embodiments of the present invention a low-cost integrated circuit (IC) for use in a switched-mode power supply circuit includes a control circuit, a sensing circuit, and drivers for a cascode switch. The IC is architected in such a way that reduces the number of external components used to start up the power circuit and maintain a local power supply to the IC. In some embodiments directed towards a flyback switched-mode power supply that operates in a quasi-resonant (QR) mode, valley detection is implemented in which there is a 90° phase shift between the voltage of the cascode switch and the current through the cascode switch. By sensing a zero-crossing of the current through the cascode switch, the valley is detected, in accordance with some embodiments. Advantages of some embodiments include a low-cost power control IC, lower system cost for the SMPS circuit, lower standby power consumption, and better electro-magnetic interference (EMI) performance, as examples.

Figure 1:
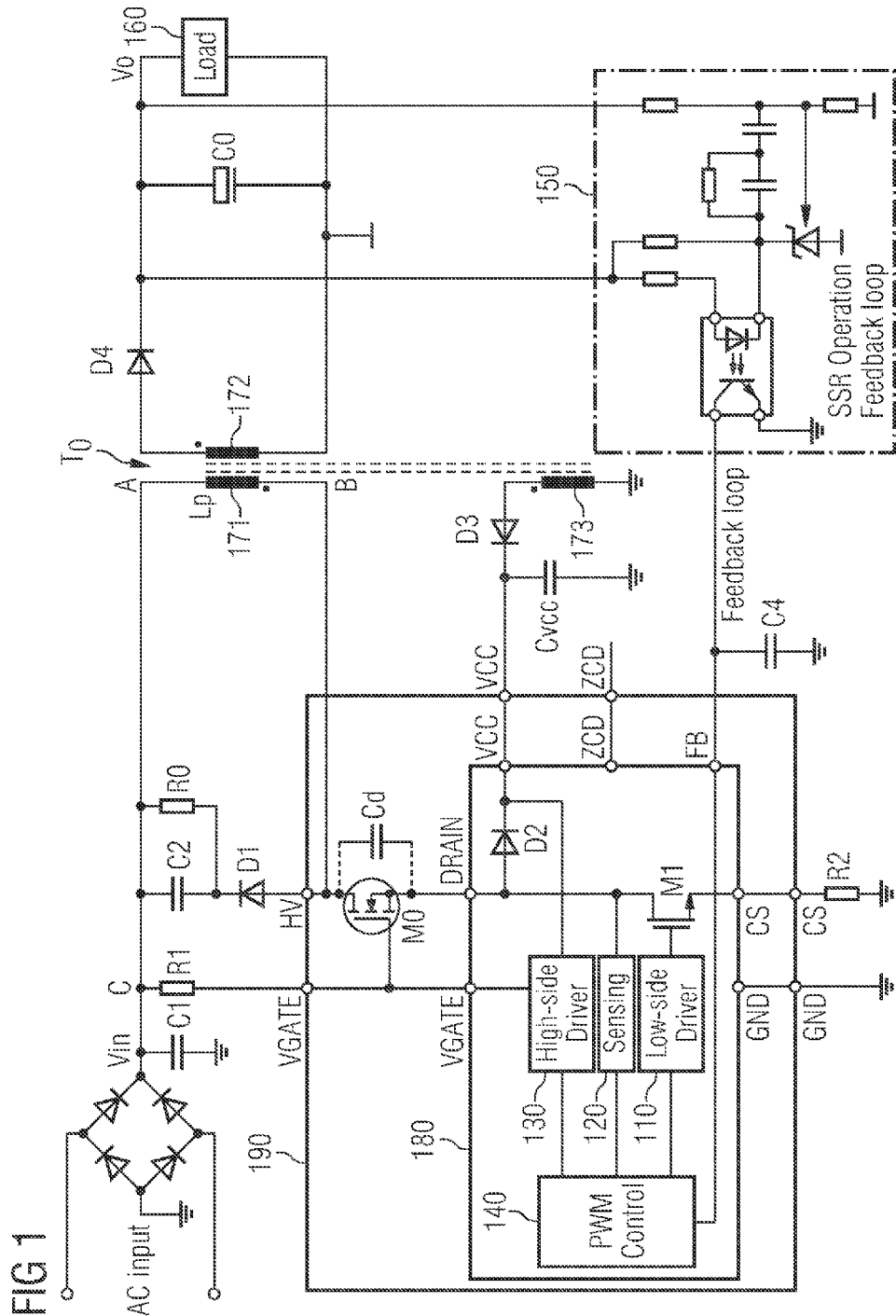
FIG. 1 illustrates a power converter with a cascode switch in some embodiments.

FIG. 1 illustrates a switched-mode flyback converter 100 using a cascode switch that includes transistors $M_0$ and $M_1$, in accordance with some embodiments. A flyback converter is illustrated in FIG. 1 an example; however, the use of a flyback converter in FIG. 1 is not intended to be limiting, as other suitable circuits and/or power converters may also be used with the cascode switch. The discussion below may refer to the power converter as a flyback converter, with the understanding that other types of power converter or circuits may also be used with the cascode switch disclosed herein.

Referring to FIG. 1, two switching transistors $M_0$ and $M_1$ are coupled in series between transformer $T_0$ of flyback converter 100 and a sensing terminal CS. Sensing terminal CS is coupled to electrical ground via resistor $R_2$ in FIG. 1, but may be coupled to other reference potentials in alternative embodiments. As illustrated in FIG. 1, switching transistor $M_0$ is coupled between primary winding 171 of transformer $T_0$ and switching transistor $M_1$, with the drain of switching transistor $M_0$ coupled to terminal B of the primary winding of transformer $T_0$, and the source of switching transistor $M_0$ coupled to the drain of switching transistor $M_1$. The source of switching transistor $M_1$ is coupled to sensing terminal CS. In the discussion hereinafter, the switching transistor (e.g., transistor $M_1$) closest to sensing terminal CS may be referred to as the low-side transistor and switching transistor (e.g. transistor $M_0$) closest to the transformer may be referred to as the high-side transistor.

As shown in FIG. 1, an input voltage $V_{in}$ is supplied to an input terminal C of circuit 100. In FIG. 1, input voltage $V_{in}$ is shown as a rectified AC voltage for the purpose of illustration, however, one skilled in the art will appreciate that other suitable input voltages, such as a DC voltage, may also be used as the input voltage. Terminal A of primary winding 171 of transformer $T_0$ is coupled to input terminal C, thus input voltage $V_{in}$ is also applied to terminal A of the primary winding of transformer $T_0$. The secondary winding 172 of transformer $T_0$ is coupled to a load 160 via a rectifier diode $D_4$, in some embodiments.

Figure 4:
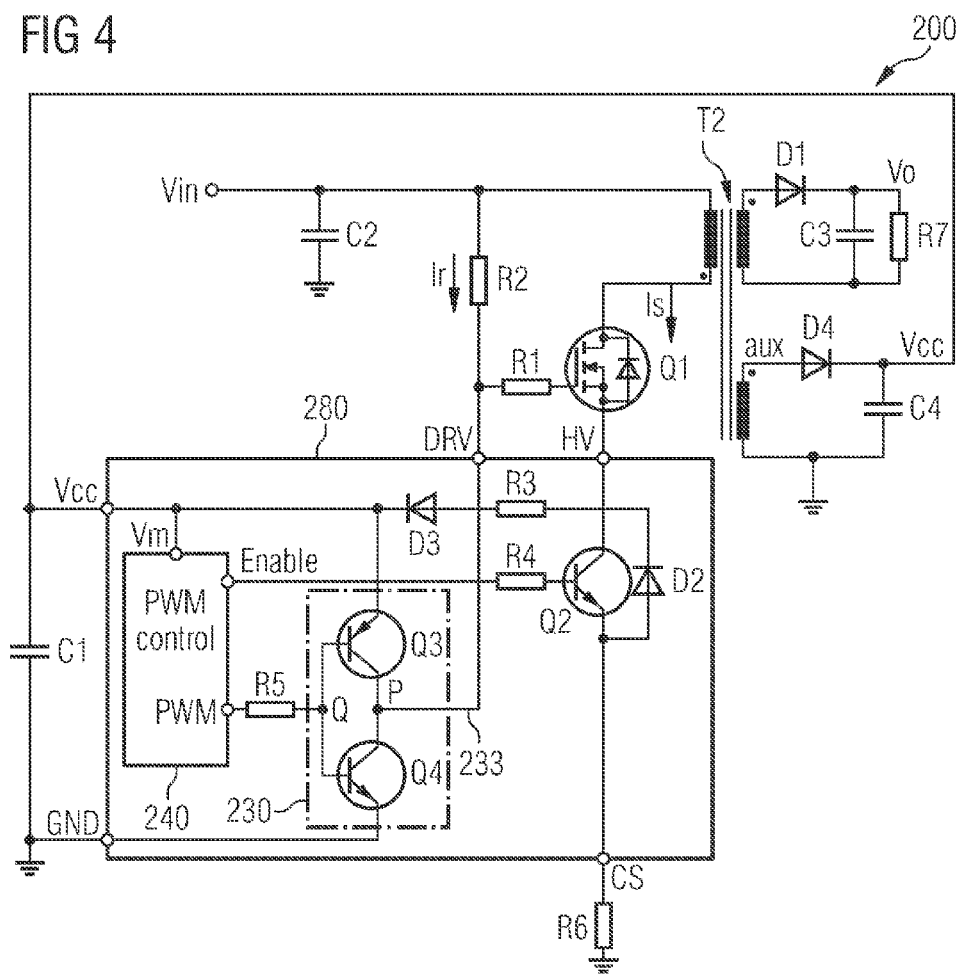
FIG. 4 illustrates another power converter with a cascode switch in various embodiments.

FIG. 1 illustrates a driver circuit 130, also referred to as a driver 130 or high-side driver 130, that is coupled to the gate of high-side transistor $M_0$. The gate of a transistor is used for controlling the operation of the transistor, thus is sometimes referred to as the control node of the transistor. An input terminal of driver 130 may be coupled to a pulse-width-modulation (PWM) control circuit 140. PWM control circuit 140 may include a pulse-width modulator (not shown) and a controller (not shown), which pulse-width modulator is coupled to and controlled by the controller. The controller of PWM control circuit 140 may be a microcontroller unit (MCU), an application-specific integrated circuit (ASIC), a control circuit built using discrete components, or any other suitable controller. As shown in FIG. 1, PWM control circuit 140 may receive feedback signal(s) from feedback circuit 150 to monitor the operation and status of circuit 100. PWM Control circuit 140 may generate a pulse train (e.g., a series of voltage pulses with desired pulse width and pulse amplitude) to turn on and off high-side transistor $M_0$, as discussed in more detail hereinafter. Driver 130 of high-side transistor $M_0$ may include any suitable driver circuit. For example, a totem pole driver 210 including transistors $Q_3$ and $Q_4$ is shown in FIG. 4 for high-side transistor $Q_1$ of FIG. 4. Referring back to FIG. 1, the gate of high-side transistor $M_0$ is coupled to input terminal C via resistor $R_1$. The drain of high-side transistor $M_0$ may be coupled to input terminal C via diode $D_1$, resistor $R_0$ and capacitor $C_2$, where resistor $R_0$ and capacitor $C_2$ are coupled in parallel between diode $D_1$ and input terminal C.

As illustrated in FIG. 1, a low side driver 110 is coupled to the gate of low-side transistor $M_1$. Low side driver 110 may be coupled to and may be controlled by PWM control circuit 140. In some embodiments, low-side transistor $M_1$, low-side driver 110, high-side driver 130, sensing circuit 120 (discussed hereinafter with reference to FIGS. 2 and 3) and PWM control circuit 140 are integrated into an integrated circuit (IC) 180, e.g., a power control IC 180. IC 180 may include electrical components such as transistors, resistors, inductors, capacitors, or the like that are formed in or on a suitable semiconductor substrate and interconnected by conductive features such as conductive lines, vias to perform designed functions. Examples of semiconductor substrates include for example, bulk silicon, doped or undoped, or an active layer of a semiconductor-on-insulator (SOI) substrate. Alternatively, the substrate materials know in the art may be used. As will be discussed in more detail hereinafter, the integration of various functional modules of the SMPS circuit into an IC (e.g., IC 180) provides many advantages such as reduced cost, reduced form factor and lower power consumption.

Referring to FIG. 1, IC 180 has a number of terminals for connection with other portions of circuit 100 that are outside IC 180. For example, IC 180 has a terminal DRAIN for connection with the source of high-side transistor $M_0$, a terminal VGATE for connection with the control node of high-side transistor $M_0$, a terminal CS for connection with a reference voltage via resistor $R_2$, a terminal Vcc for connection with an external capacitor $C_{vcc}$, and a terminal FB for connection with feedback circuit 150. IC 180 may include other terminals that are not shown in FIG. 1, and not all terminals are discussed above (e.g., terminals GND and ZCD). In various embodiments, high-side transistor $M_0$ may be integrated with IC 180 to form an IC 190 for higher level of integration. In other embodiments, high-side transistor $M_0$ is not integrated with IC 180.

Still referring to FIG. 1, IC 180 includes a diode $D_2$ coupled between the drain of low-side transistor $M_1$ and terminal Vcc of IC 180, which terminal Vcc is coupled with an external capacitor $C_{vcc}$. During the start up process of circuit 100, when input voltage $V_{in}$ is applied to input terminal C, high-side transistor $M_0$ is biased into linear mode, therefore electrical current flows through resistor $R_1$, the gate-source capacitor of high-side transistor $M_0$, and charges capacitor $C_{vcc}$ through diode $D_2$. Voltage $V_{cc}$ across capacitor $C_{vcc}$ is accessible at terminal Vcc of IC 180 and may be used by internal modules of IC 180. Once the voltage at $C_{vcc}$ reaches a pre-determined values, e.g., 20 volt, low-side transistor $M_1$ is turned on, and PWM control circuit 140 starts switching on and off high-side transistor $M_0$ for normal operation of SMPS circuit 100. PWM control circuit 140 may turn on low-side transistor $M_1$ by generating a voltage at the gate of low-side transistor $M_1$. In accordance with some embodiments, low-side transistor $M_1$ stays on during normal operation of SMPS circuit 100. Once circuit 100 enters normal operation mode (e.g., low-side transistor $M_1$ stays on and high-side transistor $M_0$ starts switching on and off), the input voltage for IC 180 may be provided at terminal Vcc of IC 180 by auxiliary winding 173 via diode $D_3$, as shown in FIG. 1.

As discussed above, the start up process is performed using resistor $R_1$, high-side transistor $M_0$, diode $D_2$ and capacitor $C_{vcc}$. In some embodiments, the only external components associated with this start up process is resistor $R_1$ and capacitor $C_{vcc}$, thereby advantageously reducing component costs associated with dedicated start up circuitry. In addition, since the gate-source capacitance of high-side transistor $M_0$ is very small, resistor $R_1$ can be designed to have a large resistance (e.g., about 100 MΩ or more) such that a small charging current slowly charges capacitor $C_{vcc}$ via diode $D_2$. Therefore, internal diode $D_2$ does not have to accommodate a large current. As a result, the silicon area used for fabricating internal diode $D_2$ is small, further reducing the cost of IC 180. Another advantage is that due to the small current through resistor $R_1$, power loss through resistor $R_1$ is small and does not influence system standby power. Furthermore, since resistor $R_1$ is connected to high-side driver 130 inside IC 180, no external stabilization capacitor (e.g., a capacitor coupled between resistor $R_1$ and a reference voltage such as electrical ground) is needed in the presently disclosed SMPS circuit 100, which is another cost advantage over existing SMPS designs.

During normal operation, low-side transistor $M_1$ stays on, as discussed above. The drain voltage of low-side transistor $M_1$, after the start up process, is therefore low during the normal operation. Consequently, diode $D_2$ coupled to the drain of low-side transistor $M_1$ does not have to clamp the drain voltage of the low-side transistor $M_1$ for protection during switching off of the cascode switch. Since clamping the drain voltage of low-side transistor $M_1$ may cause a large current (e.g., several Amperes) to flow through the diode, an external diode (e.g., a discrete-component diode external to IC 180) may be used to accommodate such a large current. By obviating the need to clamp drain voltage of low-side transistor $M_1$, diode $D_2$ can be integrated inside IC 180, which significantly reduces system cost for circuit 100.

Referring to FIG. 1, during normal operation of SMPS circuit 100, high-side transistor $M_0$ is turned on and off alternately by PWM control circuit 140. When high-side transistor $M_0$ is turned on, a load current flows through primary winding 171 of transformer $T_0$, high-side transistor $M_0$ and low-side transistor $M_1$, and energy is stored as electromagnetic field in transformer $T_0$. Diode $D_4$ coupled to secondary winding 172 is reverse biased when high-side transistor $M_0$ is turned on, thus no current flows through secondary winding 172 of transformer $T_0$. Diode $D_4$ may be replaced by a switch that is used as a synchronous rectifier, as skilled artisans will appreciate. After the high-side transistor $M_0$ is turned off, the stored magnetic field collapses, and energy is transferred to the output of the transformer (e.g., secondary winding 172), generating an output voltage across secondary winding 172 and a current in secondary winding 172. The transformer is demagnetized when the energy is transformed to the secondary winding. When the demagnetizing process ends, an LC resonant circuit is formed that includes the capacitance seen at the drain of high-side transistor $M_0$ and inductor $L_p$ of primary winding 171, and a ringing or oscillating voltage $V_{ds}$, sometimes referred to as a resonant voltage $V_{ds}$, appears across the drain and the source of high-side transistor $M_0$, and an oscillating current $I_{ds}$, sometimes referred to as a resonant current $I_{ds}$, flows through high-side transistor $M_0$ and low-side transistor $M_1$. The electrical path between the drain and the source of transistor $M_0$ or $M_1$ may sometimes be referred to as a load path of transistor $M_0$ or $M_1$, and the drain and the source of transistor $M_0$ or $M_1$ may sometimes be referred to as the load path terminals of transistor $M_0$ or $M_1$. Details of the resonant voltage $V_{ds}$ and $I_{ds}$ are shown in FIG. 2 and discussed below.

Figure 2:
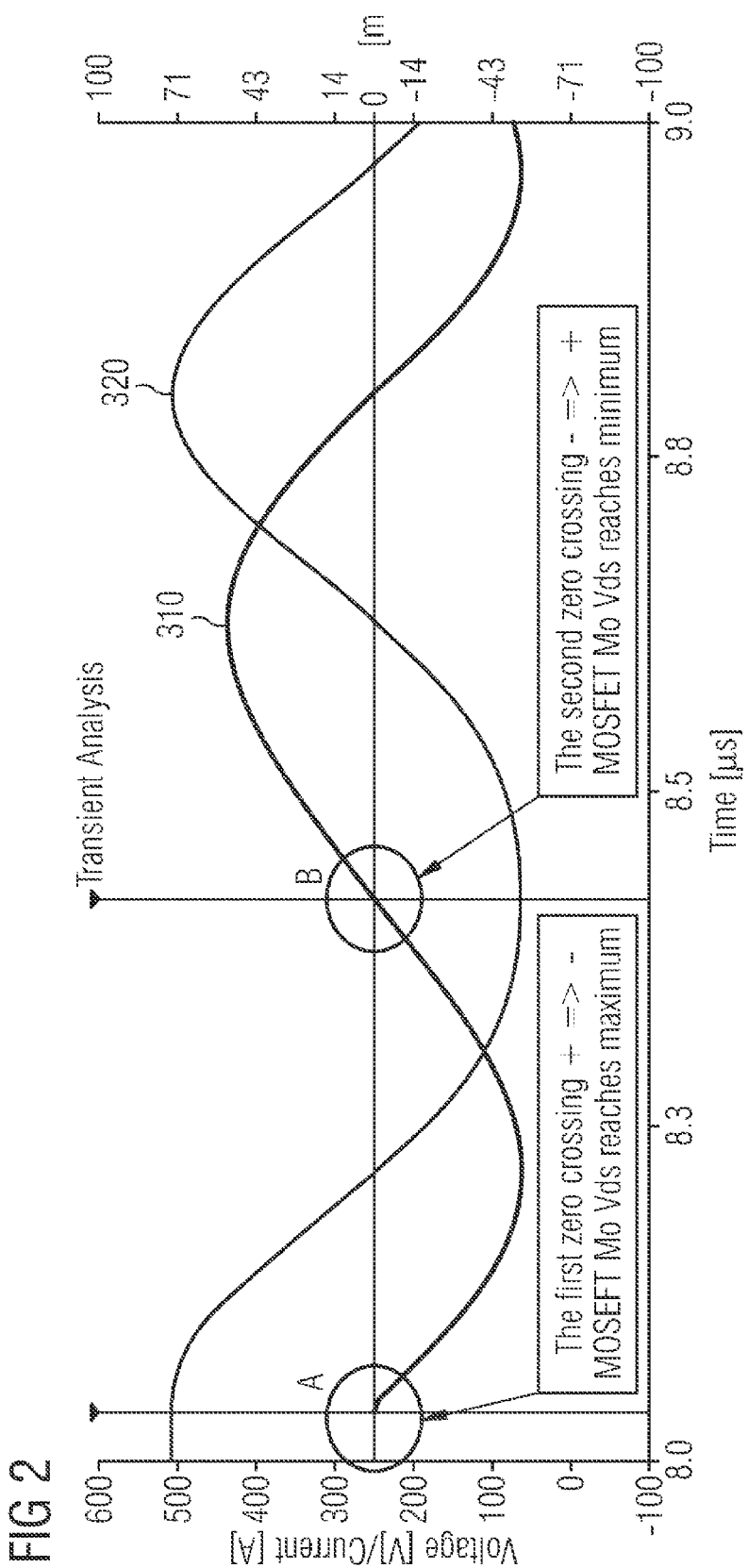
FIG. 2 illustrates a timing diagram of a voltage and a current of one or more switching transistors during a quasi-resonant mode operation, in accordance with some embodiments.

Referring to FIG. 2, waveform 320 shows resonant voltage $V_{ds}$ of high-side transistor $M_0$, and waveform 310 shows resonant current $I_{ds}$ that flows through high-side transistor $M_0$ and low-side transistor $M_1$. The X-axis of FIG. 2 represents time, and the Y-axes represent the values for $V_{ds}$ voltage (Y-axis on the left side of FIG. 2) or $I_{ds}$ current (Y-axis on the right side of FIG. 2). As shown in FIG. 2, resonant voltage $V_{ds}$ oscillates between a maximum value around $V_{max}=V_{in}+V_R$ and a minimum value around $V_{min}=V_{in}-V_R$, where $V_{in}$ is the input voltage at input terminal C, and $V_R$ is the flyback reflected voltage. This ringing or oscillation is due to the LC circuit formed by inductance $L_p$ of primary winding 171 and total parasitic capacitance seen at the drain of high-side transistor $M_0$. This oscillation occurs after switch $M_0$ is turned off and the transformers demagnetizes. It may be advantageous to turn on switch $M_0$ when resonant voltage $V_{ds}$ is at a minimum value during the oscillation. For example, turn-on losses of the SMPS circuit 100 can be minimized or reduced. Such minimum values of resonant voltage are sometimes called valleys or valley points, and the operation mode to turn on switch $M_0$ at valley points is called valley switching or quasi-resonant (QR) operation mode. Besides lowering turn-on loss, another advantage of the QR operation mode is lower EMI interference, which is due to, at least in part, transistor $M_0$ being turned on at a low voltage level. Sensing circuit 120 is thus designed to detect the valley points, in some embodiments. As illustrated in FIG. 2, resonant current $I_{ds}$ also oscillates between a maximum and minimum value, but at a different phase from that of resonant voltage $V_{ds}$. In some embodiments, resonant current $I_{ds}$ is 90° out of phase with resonant voltage $V_{ds}$. In various embodiments, resonant voltage $V_{ds}$ across transistor $M_0$ decreases when the current flowing through $R_2$ (e.g., resonant current $I_{ds}$) is negative, and resonant voltage $V_{ds}$ across transistor $M_0$ increases when the current flowing though resistor $R_2$ (e.g., resonant current $I_{ds}$) is positive. Sensing circuit 120 is thus designed to detect the point where resonant voltage $V_{ds}$ across transistor $M_0$ changes trend from a decreasing state to an increasing state, in some embodiments.

Still referring to FIG. 2, due to the phase relation between resonant voltage $V_{ds}$ and resonant current $I_{ds}$, the moment when resonant voltage $V_{ds}$ reaches a minimum voltage can be detected by monitoring resonant current $I_{ds}$. In particular, in the example of FIG. 2, when the value of resonant current $I_{ds}$ has a negative-to-positive transition (see label B in FIG. 2), which transition is also referred to as a negative-to-positive zero-crossing or a zero-crossing with a positive gradient, resonant voltage $V_{ds}$ reaches the minimum value (e.g., around 100 volt). Contrariwise, when resonant current $I_{ds}$ has a positive-to-negative transition (see label A in FIG. 2), resonant voltage $V_{ds}$ reaches a maximum (e.g., around 500 volt). A positive-to-negative transition may be referred to as a positive-to-negative zero-crossing or a zero-crossing with a negative gradient. Therefore, the moment of minimum value for resonant voltage $V_{ds}$ can be determined by detecting a corresponding zero-crossing (e.g., negative-to-positive zero-crossing in FIG. 2) of resonant current $I_{ds}$, in accordance with some embodiments.

The phase relation between resonant voltage $V_{ds}$ and resonant current $I_{ds}$ is determined by the particular design of circuit 100, thus may change for a different design of circuit 100. For example, for other circuit designs, the moment when resonant voltage $V_{ds}$ reaches the minimum value may be determined by detecting a positive-to-negative zero-crossing of resonant current $I_{ds}$. For easy of discussion hereinafter, for a particular circuit, the type of zero-crossing (e.g., negative-to-positive, or positive-to-negative) that corresponds to a minimum resonant voltage $V_{ds}$ is called a "corresponding zero-crossing" for that circuit. In QR operation mode, high-side switch $M_0$ does not have to be turned on at the first corresponding zero-crossing. Instead, PWM controller 140 may choose to turn on high-side transistor $M_0$ at the second corresponding zero-crossing, the third corresponding zero-crossing, and so on. Turing on high-side transistor $M_0$ at a later zero-crossing (e.g., a seventh corresponding zero-crossing) reduces the switching frequency of the power converter, which may help to improve the operating power efficiency of the power converter under light load conditions.

Referring back to FIG. 1, detecting zero-crossing of resonant current $I_{ds}$ may be achieved by monitoring the drain voltage of low-side transistor $M_1$, which drain voltage may be proportional to the resonant current $I_{ds}$ due to, e.g., resistor $R_2$ coupled between low-side transistor $M_1$ and a reference level (e.g., electrical ground). As shown in FIG. 1, an input of sensing circuit 120 is coupled to the drain of low-side transistor $M_1$. Sensing circuit 120 may detect zero-crossings by monitoring the drain voltage of low-side transistor $M_1$. In some other embodiments, sensing circuit 120 may be coupled to the source of low-side transistor for detecting zero-crossings. Sensing circuit 120 in FIG. 1 detects zero-crossing by monitoring a voltage at a load path terminal (e.g., the drain or the source) of low-side transistor $M_1$, this allows for simply solutions for sensing circuit 120 (see, e.g., FIG. 3 and discussion therewith) that can be integrated inside IC 180. Consequently, the present disclosure does not need an external sensing circuit (e.g., sensing circuit external to IC 180) to detect the moment of minimum voltage across high-side transistor, thus lowering the overall system cost. Other advantages may include smaller system footprint and lower power consumption due to higher levels of integration.

Figure 3:
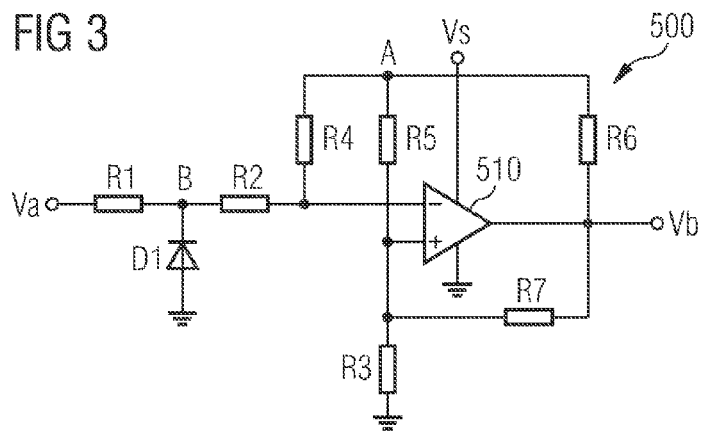
FIG. 3 illustrates a diagram of a sensing circuit in some embodiments.

FIG. 3 illustrates an embodiment sensing circuit 500 that may be used as sensing circuit 120 in FIG. 1. As illustrated in FIG. 3, sensing circuit 500 includes an operational amplifier 510 that has a reference voltage $V_s$. The negative input terminal of operational amplifier 510 is coupled to an input terminal $V_a$ via resistors $R_1$ and $R_2$. Input terminal $V_a$ is coupled to a voltage to be sensed, which in the example of FIG. 1, may be the drain voltage of low-side transistor $M_1$. In other embodiments, the input voltage at terminal $V_a$ may be a voltage measured at other locations that could be used to detect the sign of resonant current $I_{ds}$, e.g., the source voltage of low-side transistor $M_1$ in FIG. 1. Diode $D_1$ is coupled between a reference voltage (e.g., electrical ground) and a node B between resistor $R_1$ and $R_2$. The positive input terminal of operational amplifier 510 is coupled a reference voltage (e.g., electrical ground) via resistor $R_3$. Resistor $R_7$ is coupled between output terminal $V_b$ and the positive input terminal, and resistors $R_4$ and $R_6$ are coupled in series between the negative input terminal of operational amplifier 510 and output terminal $V_b$. Resistor $R_5$ is coupled between the positive input terminal and a node A between resistors $R_4$ and $R_6$. Output voltage $V_b$ of sensing circuit 500 may be used for determining the zero-crossings in quasi-resonant operation mode. In various embodiments, sensing circuit output voltage $V_b$ is sent to a control unit, e.g., PWM control circuit 140 in FIG. 1, for processing.

Referring to FIG. 3, when a negative voltage is applied at terminal $V_a$ of sensing circuit 500, output voltage at terminal $V_b$ is zero. When a positive voltage is applied to terminal $V_a$ of sensing circuit 500, output voltage at terminal $V_b$ is a high voltage level (e.g., +15 volt). Consequently, when a negative-to-positive zero-crossing of input voltage at terminal $V_a$ happens, output voltage at terminal $V_b$ changes from zero to a high voltage (e.g., +15 volt). Similarly, output voltage at terminal $V_b$ changes from a high voltage to zero for a positive-to-negative transition of input voltage at terminal $V_a$. Such a zero-to-high or high-to-zero transition of output voltage at terminal $V_b$ can be monitored by and/or recognized by, e.g., PWM control circuit to detect zero-crossings which may facilitate front end control of a power converter. Detection of zero-crossings that correspond to minimum voltage at a switching transistor (e.g., high-side transistor $M_0$ in FIG. 1) can be used to turn on the switching transistor in quasi-resonant operation mode, in some embodiments.

FIG. 3 illustrates an example of a sensing circuit. Other types of sensing for detecting zero-crossings are possible. For example, an input voltage such as the drain voltage of transistors $M_1$ or $M_0$ can be sent directly to PWM control circuit 140 without a dedicated sensing circuit (e.g., sensing circuit 120). PWM control circuit may include a micro-controller unit that has one or more built-in analog-to-digital converter (ADC), which converts the input voltage into digital signals. By monitoring the digitized input voltage provided by ADC, the micro-controller unit can detect the minimum value of resonant voltage $V_{ds}$, in some embodiments. For example, when the drain voltage of transistor $M_1$ is digitized by the ADC, the micro-controller unit detects zero-crossings of the drain voltage of transistor $M_1$. As another example, when the drain voltage of transistor $M_0$ is digitized by the ADC, the micro-controller unit detects a minimum value of the drain voltage of transistor $M_0$.

FIG. 4 illustrates a switched-mode flyback converter 200 using a cascode switch that includes transistors $Q_1$ and $Q_2$, in accordance with some embodiments. High-side transistor $Q_1$ may be a MOSFET. Low-side transistor $Q_2$ may be a bi-directional switch that can be designed as a combination of bi-polar junction NPN transistor with diode or MOSFET (e.g., body diode $D_2$ of transistor $Q_2$ is used for reverse current). Diode $D_2$ in FIG. 4 is used to illustrate the body diode of low-side transistor $Q_2$, thus diode $D_2$ is not a separate diode from low-side transistor $Q_2$. In FIG. 4, low-side transistor is shown as a bi-polar transistor (BJT) for the purpose of illustration. The base of BJT is used to control operation of the BJT, thus is sometimes referred to as the control node of the BJT. The electrical path between the emitter and the collector of a BJT may sometimes be referred to as a load path of the BJT, and the emitter and the collector of the BJT may be referred to as the load path terminals of the BJT. Although low-side transistor is shown as a BJT for the purpose of illustration in FIG. 4, one skilled in the art will appreciate that other suitable switches, such as MOSFETs, may also be used as low-side transistor.

As illustrated in FIG. 4, an output 233 of a high-side driver 230 is coupled to the control node of high-side transistor $Q_1$. High-side driver 230 may include transistor $Q_3$ and $Q_4$, which may be bi-polar junction transistors (BJTs). As illustrated in FIG. 4, the emitter of BJT $Q_3$ is coupled to a Vcc terminal, which may be a voltage terminal. The collector of BJT $Q_3$ is coupled to the collector of BJT $Q_4$ at node P, which node P is coupled to output 233 of high-side driver 230. The emitter of BJT $Q_4$ is coupled to a reference voltage level (e.g., electrical ground). The base of BJT $Q_3$ is coupled to the base of BJT $Q_4$ at node Q, which is coupled to PWM control circuit 240 via resistor $R_5$. A low-side driver for low-side transistor $Q_2$, which may include resistor $R_4$, is coupled to the base of low-side transistor $Q_2$. The collector of low side transistor $Q_2$ is coupled to the Vcc terminal via diode $D_3$ and resistor $R_3$, and the Vcc terminal is coupled to capacitors $C_1$ and $C_4$, in some embodiments. As shown in FIG. 4, the collector of low-side transistor $Q_2$ is also coupled to terminal $V_m$ of PWM control circuit 240 via resistor $R_3$ and diode $D_3$. As an example of fixed frequency flyback structure, resistor $R_6$ may be used as a sensing element (e.g., a part of a sensing circuit) to obtain information about the current that flows through low-side transistor $Q_2$. The information about the current can be used for, e.g., controlling the switching of transistor in fixed frequency operation mode. In other embodiments, the voltage at terminal Vcc may be sensed and use for, e.g., closing the voltage control loop, as examples. One skilled in the art will appreciate that many of the advantages of circuit 100 in FIG. 1 apply to circuit 200 in FIG. 2, details are thus not repeated here.

Referring to FIG. 4, low-side transistor $Q_2$, PWM control circuit 240, high-side driver 230, diode $D_3$, resistor $R_3$, $R_4$ and $R_5$ may be integrated into an integrated circuit 280 on a semiconductor substrate, in accordance with some embodiments. IC 280 may include electrical components such as transistors, resistors, inductors, capacitors, or the like that are formed in or on a suitable semiconductor substrate and interconnected by conductive features such as conductive lines, vias to perform designed functions. Examples of semiconductor substrate are similar to those discussed above for IC 180 with reference to FIG. 1 and are not repeated here. Advantages of an integrated IC solution are similar to those discussed above regarding IC 180, thus are not repeated here.

Still referring to FIG. 4, during the start up process, when the input voltage $V_{in}$ is applied, current $I_r$ flows through resistors $R_2$, resistor $R_1$, input capacitance $C_{iss}$ of high-side transistor $Q_1$, resistor $R_3$ and diode $D_3$ to charge capacitors $C_1$ and $C_4$ that are coupled to the Vcc terminal. When input capacitance $C_{iss}$ of high-side transistor $Q_1$ is charged above a threshold, high-side transistor $Q_1$ conducts and current $I_s$ flows through the load path of transistor $Q_1$. Both current $I_r$ and current $I_s$ now charge capacitors $C_1$ and $C_4$. In some embodiments, control logic such as PWM control circuit 240 monitors the voltage at terminal Vcc, when the voltage at terminal Vcc reaches a pre-determined threshold (e.g., 20 volt), the control logic turns on low-side transistor $Q_2$ and enters normal operation mode. Low-side transistor $Q_2$ stays on during normal operation mode, in various embodiments. During the normal operation mode, PWM control circuit 240 generates control pulses that are sent to high-side driver 230. High-side driver 230 is coupled to high-side transistor $Q_1$ and turns on and off high-side transistor $Q_1$ according to the control pulses, in some embodiments. High-side driver 230 shown in FIG. 4 is sometimes referred to as a totem-pole driver. After the start up process ends (e.g., when circuit 200 enters normal operation mode), auxiliary winding (labeled as aux in FIG. 4) of the transformer provides power supply at the Vcc terminal, in some embodiments.

FIG. 5 illustrates a switched-mode buck converter 300 using a cascode switch that includes transistors $Q_1$ and $Q_2$, in accordance with some embodiments. High-side transistor $Q_1$ and low-side transistor $Q_2$ may use any suitable switches, such as MOSFETs or BJTs. In the example of FIG. 5, high-side transistor $Q_1$ is a MOSFET, and low-side transistor $Q_2$ is a BJT. As illustrated in FIG. 5, a driver 320 is controlled by a PWM control circuit 340, and the output of driver 320 is coupled to the gate of high-side transistor $Q_1$. The base of low-side transistor $Q_2$ is coupled to PWM control circuit 340. In some embodiments, the collector voltage of low-side transistor $Q_2$ is coupled to a pin (e.g., a ZVS pin) of PWM control circuit 340. The collector voltage might be monitored by PWM control circuit 340 for detecting zero-crossings in quasi-resonant operation mode, as discussed above. As illustrated in FIG. 5, the collector of low-side transistor $Q_2$ is also coupled to terminal $V_m$ of PWM control circuit via resistor $R_3$ and diode $D_3$. In embodiments where transistor $Q_2$ is a BJT, resistor $R_6$ is used as a current sensing element. For example, voltage at the top of resistor $R_6$ (e.g., source voltage of transistor $Q_2$) can be monitored to detect zero-crossings for controlling switching in quasi-resonant operation mode. In embodiments where transistor $Q_2$ is a MOSFET, the drain voltage of transistor $Q_2$ is monitored to detect a minimum value for controlling switching in quasi-resonant operation mode.

Referring to FIG. 5, during the start up process, current flows through resistor $R_2$, $R_1$, high-side transistor $Q_1$, resistor $R_3$ and diode $D_3$ to charge capacitor $C_1$ coupled to the Vcc terminal. After the start up process ends and buck converter 300 enters normal mode, low-side transistor $Q_2$ is turned on and stays on, in some embodiments. High-side transistor $Q_1$ is switched on and off by PWM control circuit 340, in various embodiments. The start up process for the buck converter circuit 300 is similar to that of flyback converter 200. Circuit 300 has many advantages such as low-cost, better EMI performance, small footprint and low power consumption, details of which are similar to those discussed above with reference to circuit 100 in FIG. 1, thus not repeated here.

As illustrated in FIG. 5, low-side transistor $Q_2$, driver stage 320, PWM control circuit 340, resistors $R_3$ and $R_4$, and diode $D_3$ may be integrated into an IC 380. IC 380 may include electrical components such as transistors, resistors, inductors, capacitors, or the like that are formed in or on a suitable semiconductor substrate and interconnected by conductive features such as conductive lines, vias to perform designed functions. Examples of semiconductor substrate are similar to those discussed above for IC 180 with reference to FIG. 1 and are not repeated here.

FIG. 6 illustrates a flow chart of a method of operating a power system, in accordance with some embodiments. It should be understood that the embodiment method shown in FIG. 6 is an example of many possible embodiment methods. One of ordinary skill in the art would recognize many variations, alternatives, and modifications. For example, various steps as illustrated in FIG. 6 may be added, removed, replaced, rearranged and repeated.

Referring to FIG. 6, at step 1010, a second switching transistor coupled between a first switching transistor and a primary winding of a transformer is turned off. At step 1020, a zero-crossing of a first current that flows through the first switching transistor is detected after the turning off the second switching transistor. At step 1030, the second switching transistor is turned on upon detecting the zero-crossing.

Embodiments of the present invention are summarized here. Other embodiments can also be understood form the entirety of the specification and the claims filed herein. One general aspect includes a power system including an integrated circuit (IC). The IC includes a first switching transistor having a load path coupled between a sensing terminal of the IC and a first terminal of the IC. The first terminal of the IC is configured to be coupled to a first load path terminal of a second switching transistor. The IC also includes a first diode coupled between the first terminal of the IC and a second terminal of the IC. The second terminal is configured to be coupled to an auxiliary winding of the power system. The IC further includes a first driver circuit having an output coupled to a third terminal of the IC. The third terminal is configured to be coupled to a control node of the second switching transistor.

Implementations may include one or more of the following features. The IC may further include a pulse-width modulation (PWM) control circuit configured to keep the first switching transistor turned on during normal operation, and configured to turn on and off the second switching transistor during the normal operation. The first driver circuit may have an input coupled to the second terminal of the IC. In some embodiments, the first driver circuit includes a third transistor having a load path coupled between the second terminal of the IC and the third terminal of the IC, and a fourth transistor having a load path coupled between the third terminal of the IC and a reference terminal of the IC. The IC may further include a second driver circuit coupled to a first control node of the first switching transistor.

In some embodiments, the IC further comprises a sensing circuit coupled to a first load path terminal of the first switching transistor, where the sensing circuit is configured to detect a zero-crossing of a first current that flows through the load path of the first switching transistor. In some embodiments, the sensing circuit is configured to detect the zero-crossing by measuring a voltage at the first load path terminal of the first switching transistor. The sensing circuit is configured to detect a negative-to-positive zero-crossing, in accordance with an embodiment.

In some embodiments, the IC further includes a pulse width modulation (PWM) control circuit, where the PWM control circuit is coupled to the first driver circuit and the sensing circuit, and the PWM control circuit is configured to turn on the second switching transistor upon detection of the zero-crossing. The PWM control circuit may include a pulse width modulator. In some embodiments, a voltage at a second load path terminal of the second switching transistor is 90° out of phase with the first current. The first current may have the zero-crossing when the voltage at the second load path terminal of the second switching transistor is at a minimum. The zero-crossing is detected during a quasi-resonant operation mode of the power system, in various embodiments.

In various embodiments, the power system further includes the second switching transistor, where a second load path terminal of the second switching transistor is configured to be coupled to a first terminal of a primary winding of a transformer, and the control node of the second switching transistor is coupled to a second terminal of the primary winding via a first resistor. The power system may further include a first capacitor coupled to the second terminal of the IC. The power system may further include the transformer. In some embodiments, a secondary winding of the transformer is coupled to a load via a second diode.

Another general aspect includes a method of operating a power system including turning off a second switching transistor coupled between a first switching transistor and a primary winding of a transformer, detecting a zero-crossing of a first current that flows through the first switching transistor after the turning off the second switching transistor, and turning on the second switching transistor upon detecting the zero-crossing.

Implementations may include one or more of the following features. The first switching transistor stays on during normal operation of the power system in some embodiments. The detecting comprises monitoring a voltage of a load path terminal of the first switching transistor in some embodiments. In various embodiments, the first current is 90° out of phase with a voltage of a load path terminal of the second switching transistor. The zero-crossing corresponds to a minimum voltage on the second switching transistor, in accordance with an embodiment. The zero-crossing may have a positive gradient. The zero-crossing may have a negative gradient.

A further general aspect includes a power circuit including a first switching transistor and a second switching transistor coupled in series, where the second switching transistor is configured to be coupled between a transformer and the first switching transistor. The power circuit also include a sensing circuit coupled to a first load path terminal of the first switching transistor, and a pulse-width modulation (PWM) control circuit coupled to the sensing circuit, where the sensing circuit is configured to detect a zero-crossing of a first current that flows through the first switching transistor after the second switching transistor is turned off, and the PWM control circuit is configured to turn on the second switching transistor upon detecting the zero-crossing.

Implementations may include one or more of the following features. In some embodiments, when the first current has the zero-crossing, a voltage across the second switching transistor is at a minimum. The sensing circuit may be configured to detect a negative-to-positive zero-crossing. The power circuit of claim may further include a first driver having an first output coupled to a first control node of the first switching transistor, and a first input coupled to the PWM control circuit, and a second driver having a second output coupled to a second control node of the second switching transistor, and a second input coupled to the PWM control circuit.

The power circuit may further include a diode coupled between the first load path terminal of the first switching transistor and a first capacitor. In some embodiments, the first switching transistor, the sensing circuit, the first driver, the second driver, the diode, and the PWM control circuit are integrated into an integrated circuit (IC). In other embodiments, the second switching transistor is integrated into the IC.

Advantages of embodiments of the present invention include low-cost system designs that can be easily integrated into integrated circuits (ICs). For example, embodiments of the present invention do not need start-up cells for the start up process, which lowers system cost. By keeping the low-side transistor on in normal operation mode, the diode coupled to the drain of the low-side transistor only need to accommodate small current, which allows the diode to be integrated into ICs for low-cost solution. The method for the detection of zero-crossing allows for a simple sensing circuit, which can be integrated into the IC, and no external sensing circuit (external to the IC) is needed. In some embodiments, only an external resistor (e.g., resistor $R_1$ in FIG. 1) is used for charging the $C_{vcc}$ capacitor during the start up process. This not only reduces system cost, but also helps to reduce the standby power consumption. EMI interference is reduced by switching the high-side transistor at a minimum voltage. High levels of integration of functional blocks into an IC reduces footprint of the power converter system and power consumption.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:
1. A power system comprising:
   an integrated circuit (IC) comprising:
      a semiconductor substrate;
      a first switching transistor on the semiconductor substrate, the first switching transistor having a load path coupled between a sensing terminal of the IC and a first terminal of the IC, the first terminal of the IC configured to be coupled to a node within a current path, the current path being between a first load path terminal of a second switching transistor and a first load path terminal of the first switching transistor;

a first diode on the semiconductor substrate, the first diode being coupled between the first terminal of the IC and a second terminal of the IC, the second terminal of the IC configured to be coupled to a decoupling capacitor and an auxiliary winding of the power system; and a first driver circuit on the semiconductor substrate, the first driver circuit having an output coupled to a third terminal of the IC, the third terminal configured to be coupled to a control node of the second switching transistor.

2. The power system of claim 1, wherein the IC further comprises a pulse-width modulation (PWM) control circuit configured to keep the first switching transistor turned on during normal operation, and configured to turn on and off the second switching transistor during the normal operation.

3. The power system of claim 1, wherein the first driver circuit has an input coupled to the second terminal of the IC.

4. The power system of claim 1, wherein the IC further comprises a second driver circuit coupled to a first control node of the first switching transistor.

5. The power system of claim 1, wherein the IC further comprises a sensing circuit coupled to the first load path terminal of the first switching transistor, wherein the sensing circuit is configured to detect a zero-crossing of a first current that flows through the load path of the first switching transistor.

6. The power system of claim 5, wherein the sensing circuit is configured to detect the zero-crossing by measuring a voltage at the first load path terminal of the first switching transistor.

7. The power system of claim 5, wherein the IC further comprises a pulse width modulation (PWM) control circuit, wherein the PWM control circuit is coupled to the first driver circuit and the sensing circuit, and the PWM control circuit is configured to turn on the second switching transistor upon detection of the zero-crossing.

8. The power system of claim 7, wherein a voltage at a second load path terminal of the second switching transistor is 90° out of phase with the first current.

9. The power system of claim 8, wherein the first current has the zero-crossing when the voltage at the second load path terminal of the second switching transistor is at a minimum.

10. The power system of claim 9, wherein the zero-crossing is detected during a quasi-resonant operation mode of the power system.

11. The power system of claim 7, further comprising the second switching transistor, wherein a second load path terminal of the second switching transistor is configured to be coupled to a first terminal of a primary winding of a transformer, and the control node of the second switching transistor is coupled to a second terminal of the primary winding via a first resistor.

12. The power system of claim 11, further comprising a first capacitor coupled to the second terminal of the IC.

13. The power system of claim 12, further comprising the transformer.

14. The power system of claim 13, wherein a secondary winding of the transformer is coupled to a load via a second diode.

15. A method of operating a power system, the method comprising:

turning off a second switching transistor coupled between a first switching transistor and a primary winding of a transformer;

detecting a zero-crossing of a first current that flows through the first switching transistor after the turning off the second switching transistor; and turning on the second switching transistor upon detecting the zero-crossing.

16. The method of claim 15, wherein the first switching transistor stays on during normal operation of the power system.

17. The method of claim 15, wherein the detecting comprises monitoring a voltage of a load path terminal of the first switching transistor.

18. The method of claim 17, wherein the first current is 90° out of phase with a voltage of a load path terminal of the second switching transistor and the zero-crossing corresponds to a minimum voltage on the second switching transistor.

19. A power circuit comprising:

a first switching transistor and a second switching transistor coupled in series, wherein the second switching transistor is configured to be coupled between a transformer and the first switching transistor;

a sensing circuit coupled to a first load path terminal of the first switching transistor; and a pulse-width modulation (PWM) control circuit coupled to the sensing circuit, wherein the sensing circuit is configured to detect a zero-crossing of a first current that flows through the first switching transistor after the second switching transistor is turned off, wherein the PWM control circuit is configured to turn on the second switching transistor upon detecting the zero-crossing.

20. The power circuit of claim 19, wherein when the first current has the zero-crossing, a voltage across the second switching transistor is at a minimum.

21. The power circuit of claim 19, wherein the sensing circuit is configured to detect a negative-to-positive zero-crossing.

22. The power circuit of claim 19, further comprising:

a first driver having a first output coupled to a first control node of the first switching transistor, and a first input coupled to the PWM control circuit; and a second driver having a second output coupled to a second control node of the second switching transistor, and a second input coupled to the PWM control circuit.

23. The power circuit of claim 22, further comprising a diode coupled between the first load path terminal of the first switching transistor and a first capacitor.

24. The power circuit of claim 23, wherein the first switching transistor, the sensing circuit, the first driver, the second driver, the diode, and the PWM control circuit are integrated into an integrated circuit (IC).

25. The power circuit of claim 24, wherein the second switching transistor is integrated into the IC.

* * * * *